US008412158B2

(12) United States Patent
Forutanpour et al.

(10) Patent No.: US 8,412,158 B2
(45) Date of Patent: Apr. 2, 2013

(54) MOBILE DEVICE HAVING INCREASED SECURITY THAT IS LESS OBTRUSIVE

(75) Inventors: Babak Forutanpour, Carlsbad, CA (US); Brian Momeyer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 12/858,340

(22) Filed: Aug. 17, 2010

(65) Prior Publication Data

US 2012/0046012 A1   Feb. 23, 2012

(51) Int. Cl.
H04M 1/66   (2006.01)
(52) U.S. Cl. .......................... 455/411; 340/573.4; 726/5
(58) Field of Classification Search ............... 455/404.1, 455/411, 416, 456.2, 456.1, 410, 445; 235/382, 235/375; 713/194, 170, 183; 705/14.27, 705/40, 44; 710/306; 370/338, 395.21; 726/24, 726/2, 1, 5, 25, 6; 340/573.4
See application file for complete search history.

(56) References Cited

U.S. PATENT DOCUMENTS

| | | | | |
|---|---|---|---|---|
| 6,272,641 | B1* | 8/2001 | Ji | 726/24 |
| 7,788,700 | B1* | 8/2010 | Feezel et al. | 726/2 |
| 2002/0150282 | A1* | 10/2002 | Kinsella | 382/124 |
| 2005/0066029 | A1* | 3/2005 | Koo | 709/224 |
| 2005/0250474 | A1* | 11/2005 | Hong et al. | 455/411 |
| 2005/0285747 | A1* | 12/2005 | Kozlay | 340/573.4 |
| 2006/0007936 | A1* | 1/2006 | Shrum et al. | 370/395.21 |
| 2006/0112428 | A1 | 5/2006 | Etelapera | |
| 2007/0016795 | A1* | 1/2007 | Asano | 713/182 |
| 2007/0236330 | A1 | 10/2007 | Cho et al. | |
| 2007/0239920 | A1* | 10/2007 | Frid | 710/306 |
| 2009/0009470 | A1* | 1/2009 | Choi et al. | 345/158 |
| 2009/0085760 | A1* | 4/2009 | Lee | 340/669 |
| 2009/0172778 | A1* | 7/2009 | Stephens | 726/2 |
| 2009/0253408 | A1 | 10/2009 | Fitzgerald et al. | |
| 2010/0093308 | A1 | 4/2010 | Cohan | |
| 2010/0225443 | A1* | 9/2010 | Bayram et al. | 340/5.83 |
| 2010/0293595 | A1* | 11/2010 | Naslund et al. | 726/1 |
| 2011/0239282 | A1* | 9/2011 | Svarfvar et al. | 726/5 |

OTHER PUBLICATIONS

Markus Jakobsson et al.: "Implicit Authentication for Mobile Devices", USENIX Workshop on Hot Topics in Security, Aug. 11, 2009, all pages.*
Sun, B. et al., (Jul. 2006). Enhancing Security Using Mobility-Based Anomaly Detection in Cellular Mobile Networks, IEEE Transactions On Vehicular Technology, 55 (4), 1385-1396.

(Continued)

Primary Examiner — Mahendra Patel
(74) Attorney, Agent, or Firm — Won Tae Kim

(57) ABSTRACT

Disclosed is an apparatus and method for a mobile device to provide increased security that is less obtrusive. A mobile device includes a display device, a user interface, and a processor. The processor may be configured to execute instructions to: implement a monitoring function to monitor the operation of the mobile device and to implement a plurality of monitor functions; and implement an authentication process to compare the plurality of monitor functions to a time period to determine an authentication value, wherein if the authentication value exceeds a threshold, a lock screen is implemented on the display device, and a user is required to enter a valid passcode through the user interface for authentication. Each monitor function may be associated with a pre-determined weight such that different monitor functions are given different priorities.

52 Claims, 6 Drawing Sheets

OTHER PUBLICATIONS

Anonymous: "Program and Agenda: Network Security and Cryptography Workshop", Network Security and Cryptography Workshop 2010, Jun. 21, 2010, Jun. 25, 2010, XP002664911, Toronto, Ontario Retrieved from the Internet: URL:http://www.mitacs.ca/events/index.php"option=com_content&view=article&id=16%3Afpnet-security&catid=33%3Afpnet-topics&Itemid=14&lang=en [retrieved on Nov. 17, 2011].

Behaviosec: "Behaviometrics A paradigm shift in computer security", White Paper Apr. 14, 2008, XP055012384, Retrieved from the Internet: URL: http://www.Infosec.co.uk/ExhibitorLibrary/742/BehavioSec_Whitepaper_20.pdf [retrieved on Nov. 17, 2011].

International Search Report and Written Opinion—PCT/US2011/048136—ISA/EPO—Dec. 21, 2011.

Jakobsson et al., "Implicit Authentication for Mobile Devices", USENIX Workshop on Hot Topics in Security (HotSec) 2009, Aug. 11, 2009, XP055012369, Retrieved from the Internet: URL: http://www.pare.com/content/attachment s/Jakobsson-Shi-HotSec09.pdf [retrieved on Nov. 17, 2011].

Nashad Ahmed Safa, "Authentication of Mobile Devices from User Behavior", Network Security and Cryptography Workshop, Jun. 21, 2010, XP002663775, Toronto, Ontario Retrieved from the Internet: URL:http://www.mitacs.ca/events/images/stories/focusperiods/security-presentations/safaauthentication.pdf [retrieved on Nov. 17, 2011].

* cited by examiner

MOBILE DEVICE HAVING INCREASED SECURITY THAT IS LESS OBTRUSIVE

BACKGROUND

1. Field

The present invention relates generally to a mobile device that has increased security but at the same time is not more intrusive than unsecured systems.

2. Relevant Background

Today, the use of mobile electronic devices is wide spread. Such mobile devices can increase a user's productivity and quality of life, but they are susceptible to loss, theft, or unauthorized use. Examples of such devices are mobile devices, smart phones, cellular phones, portable digital systems (PDAs), digital cameras, mobile computers, etc., (hereinafter referred to as mobile devices). These mobile devices often carry private, confidential, and/or difficult-to-replace data, and the loss of such data further compounds the loss of the mobile device since, while a mobile device that has been lost or stolen can be physically replaced, oftentimes the data stored on such a device is confidential and/or irreplaceable.

Additionally, the authorized user of a lost or stolen mobile device may have to deal with ramifications such as the misuse of information or someone else gaining access to information stored on the mobile device. Further, it is not uncommon for hours or even days to lapse before the authorized user of the mobile device discovers the loss, and during that time, an unauthorized user may be accessing sensitive data, misappropriating information, making national and international phone calls, or running up charges for goods or services on the authorized user's accounts through on-line purchases and transactions.

Many mobile devices have a locking feature that enables the locking of the mobile device. The locking feature may prevent unauthorized access to the mobile device. Typically, the locking feature causes the functioning of the mobile device to be locked or disabled. The locking feature is typically disabled by the authorized user entering a valid passcode. The user may establish a secret valid passcode with the mobile device in order to prevent unwanted access to the user's mobile device. After the mobile device has been locked, entering the valid passcode releases, i.e., opens the lock. Therefore, releasing the lock of the mobile device is only possible for those knowing the passcode.

Due to the quality of web browsing and the great number of available applications that are used on today's mobile devices, the use of mobile devices has greatly increased and more and more mobile device users are relying on their mobile device for on-line transactions such as on-line shopping, on-line banking, paying bills, etc. Therefore, improved security protection is increasingly needed for mobile devices. To perform these on-line transactions a passcode is often required for security reasons. However, the obtrusive nature of entering a passcode each time a user wants to perform a particular on-line function often causes many users, to completely disable this feature which increases the risk, of security problems—especially if the mobile device is lost or stolen. Also, mobile devices often frequently and automatically (e.g., after a pre-determined relatively short amount of time), implement a locking feature to secure the mobile device which also requires the user to enter their passcode to release the mobile device for use. This further motivates users to disable this security feature which further enhances the risk of problems occurring if the mobile device is lost or stolen.

Despite the trend for increased mobile device use, security features on today's mobile devices have not improved beyond the usual password protection for typical non-mobile computer devices, such as non-mobile personal computers. While such security features automatically requiring a passcode for an on-line transaction are suitable for non-mobile personal computers, which are used for a period of time often greater than 20 minutes, these types of security features do not scale down to mobile devices, which are often used only for short time bursts. These short time bursts are often related to short messaging services (SMSs), chats, frequent calls, or simply enabling a quick transaction such as on-line shopping, on-line banking, paying bills, etc.

As previously described, requiring the user of a mobile device to enter a passcode to release the mobile device after a pre-determined short period of time or when the user wants to perform a particular function such as making a phone call, accessing the Internet, or performing an on-line transaction, etc., is obtrusive in nature. Unfortunately, this often causes the user to completely disable the security functions increasing the risk of security problems—especially if the mobile device is lost or stolen. There is therefore a need for techniques to increase mobile device security while at the same time making the security functions less obtrusive.

SUMMARY

Embodiments of the invention may relate to an apparatus and method for a mobile device to provide increased security that is less obtrusive. In one embodiment, a mobile device includes a display device, a user interface, and a processor. The processor may be configured to execute instructions to: implement a monitoring function to monitor the operation of the mobile device and to implement a plurality of monitor functions; and implement an authentication process to compare the plurality of monitor functions to a time period to determine an authentication value, wherein if the authentication value exceeds a threshold, a lock screen is implemented on the display device, and a user is required to enter a valid passcode through the user interface for authentication. Each monitor function may be associated with a pre-determined weight such that different monitor functions are given different priorities. However, if the threshold is not exceeded, the lock screen is not implemented and the user is not required to enter a passcode and the mobile device continues with normal operations.

DETAILED DESCRIPTION

The word "exemplary" is used herein to mean "serving as an example, instance, or illustration." Any embodiment described herein as "exemplary" or "example" is not necessarily to be construed as preferred or advantageous over other embodiments.

Figure 1:
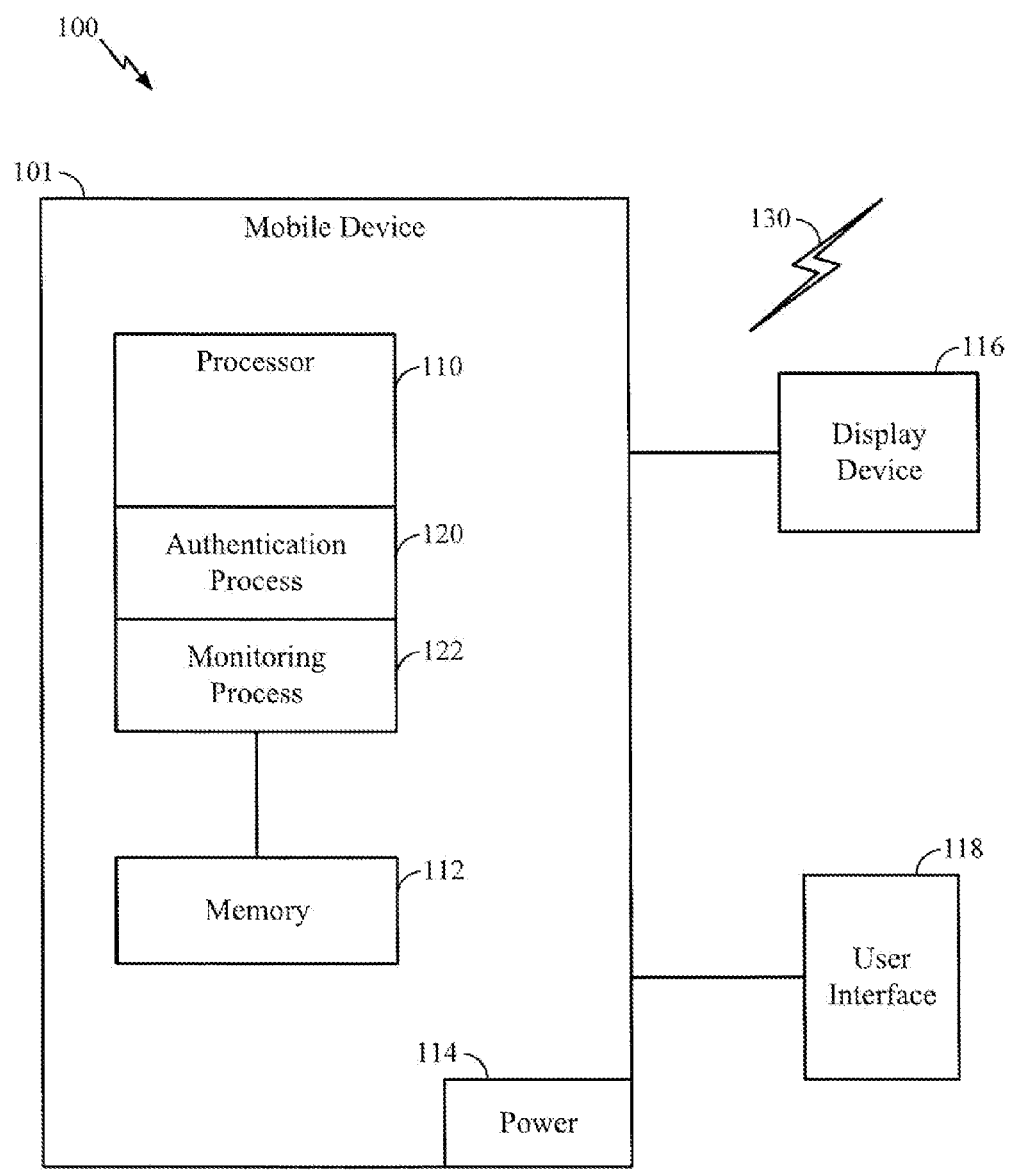
FIG. 1 is a block diagram of a system in which embodiments of the invention may be practiced.

With reference to FIG. 1, FIG. 1 is a block diagram of a system 100 in which embodiments of the invention may be practiced. In particular, system 100 illustrates a mobile device 101 that provides improved security functions in a minimally obtrusive manner. Mobile device 101 includes a processor 110, a memory 112, a power device 114, a display device 116, and a user interface 118. It should be appreciated that the display device 116 is a typical display device on a mobile device 101 such as a cell phone, personal digital assistant, mobile computer, etc. User interface 118 may be a keyboard or another type of user interface input device. Further, power device 114 may be a battery device to power mobile device 101.

In particular, mobile device 101 includes a processor 110 configured to execute instructions for implementing a monitoring process 122 and an authentication process 120. Memory 112 may be coupled to the processor 110 to store the instructions for implementation by the processor 110. Thus, the mobile device 101 having processor 110 is configured to execute instructions to: implement a monitoring process 122 to monitor the operation of the mobile device 101 and to implement a plurality of monitor functions and to implement an authentication process 120. Authentication process 120 compares the plurality of monitor functions to a time period to determine an authentication value. In particular, the authentication process 120 compares the output of the plurality of monitor functions to the average output of the same functions over the time period. If the authentication value exceeds a threshold, a lock screen may be implemented on the display device 116 and the user is required to enter a valid passcode through the user interface 118 for authentication to continue use of the mobile device 101. As will be described, each monitor function may be associated with a pre-determined weight. Also, as will be described, the pre-determined weights for the monitor functions may be selected by a user.

However, if the threshold is not exceeded, a user is not required to enter a passcode through the user interface 118 and the mobile device 101 continues with normal operations.

It should be appreciated that embodiments of the invention as will be hereinafter described may be implemented in conjunction with the execution of instructions by processor 110 of mobile device 101 and/or other circuitry of the mobile device 101 and/or other devices. Particularly, circuitry of the mobile device 101, including but not limited to processor 110, may operate under the control of a program, routine, or the execution of instructions to execute methods or processes in accordance with embodiments of the invention. For example, such a program may be implemented in firmware or software (e.g. stored in memory 112 and/or other locations) and may be implemented by processors, such as processor 110, and/or other circuitry of mobile device 101. Further, it should be appreciated that the terms processor, microprocessor, circuitry, controller, etc., refer to any type of logic or circuitry capable of executing logic, commands, instructions, software, firmware, functionality, etc.

Further, mobile or wireless device 101 may communicate via one or more wireless communication links 130 that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device 101 may therefore wirelessly communicate with other mobile devices, cell phones, other wired and wireless computers, Internet web-sites, etc.

As will be described in more detail hereinafter, embodiments of the invention provide increased security that is less obtrusive based on a multitude of different types of monitoring functions implemented by the monitoring process 122 of the mobile device 101. In particular, the mobile device 101 implements the authentication process 120 which compares the differing monitor functions to a time period to determine an authentication value. More particularly, the authentication process 120 compares the output of the plurality of monitor functions to the average output of the same functions over the time period. If the mobile device 101 determines that the authentication value has exceeded a threshold, then the mobile device 101 recognizes a security problem and implements a lock-screen on the display device 116 and requires the user to enter a valid passcode to confirm that they are the correct user of the mobile device 101. However, if the authentication value of the authentication process 120 has not exceeded the threshold, then the authentication process 120 continues and the mobile device 101 continues with normal operations.

In this way, based upon a wide variety of different monitor functions, time periods, and other factors, whether or not a lock-screen should be implemented is determined by the mobile device 101. As will further be described, these pre-determined weights and pre-determined monitor functions may be selected by a user such that the mobile device 101 can be particularly set to implement lock-screens based upon security reasons that are selected by the users themselves.

Examples of monitoring functions to be hereinafter described include pressure sensors, purchases utilizing a web browser, contact lists being deleted, different devices being called, different devices calling the mobile device, different web sites being visited, changes in battery charging, different usage of applications, deletion of applications, additions of applications, changes in web sites visited, changes in user names or passwords associated with applications, the rate at which the user enters text on the mobile device, GPS locations being different from usual GPS locations, changes in vocal sounds, as well as other types of monitor functions that will be hereinafter described.

According to embodiments of the mobile device 101, a user does not have to enter a passcode every time to utilize certain functions of the mobile device 101, such as on-line transactions, on-line banking, phone calls, etc., or at frequent time intervals; but only when a threshold value is exceeded as part of continuously implemented authentication process 120 to determine an authentication value that is based upon monitoring various monitor functions through the monitoring process 122 which is implemented to verify that the correct user is using the mobile device 101. If the authentication value exceeds the threshold, a lock-screen may be implemented on the display device 116 such that the user may be required to enter a valid passcode via the user interface for authentication purposes, providing a strong security system for the user.

Figure 2A:
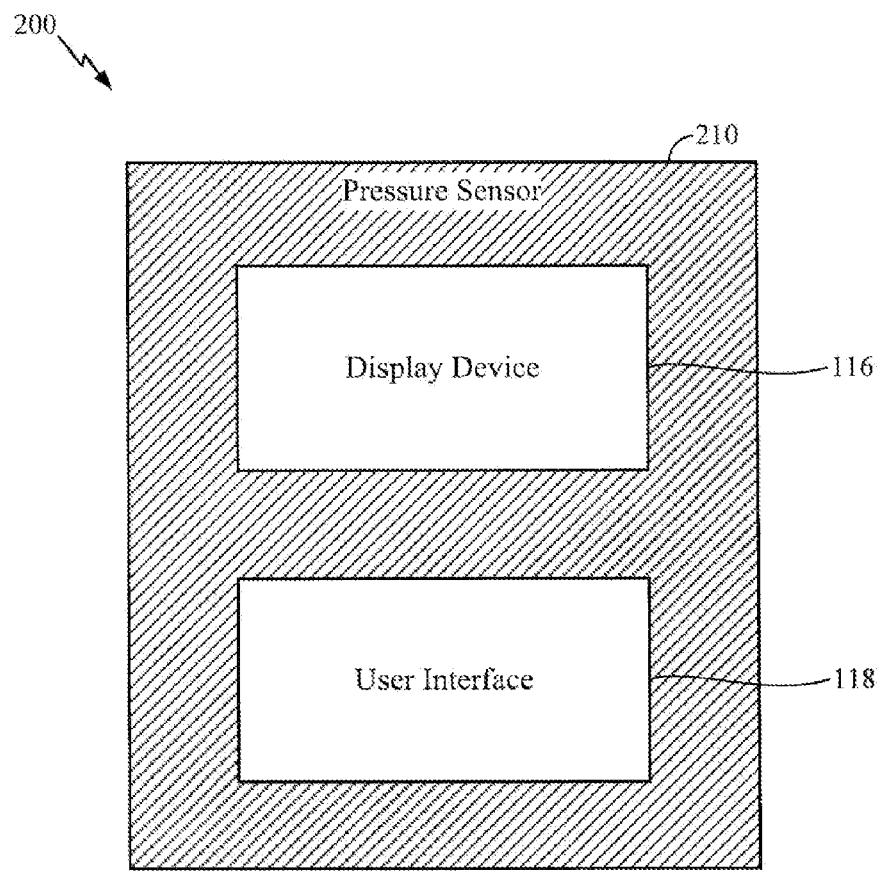
FIG. 2A is a block diagram of a front side of the mobile device having a pressure sensor.
Figure 2B:
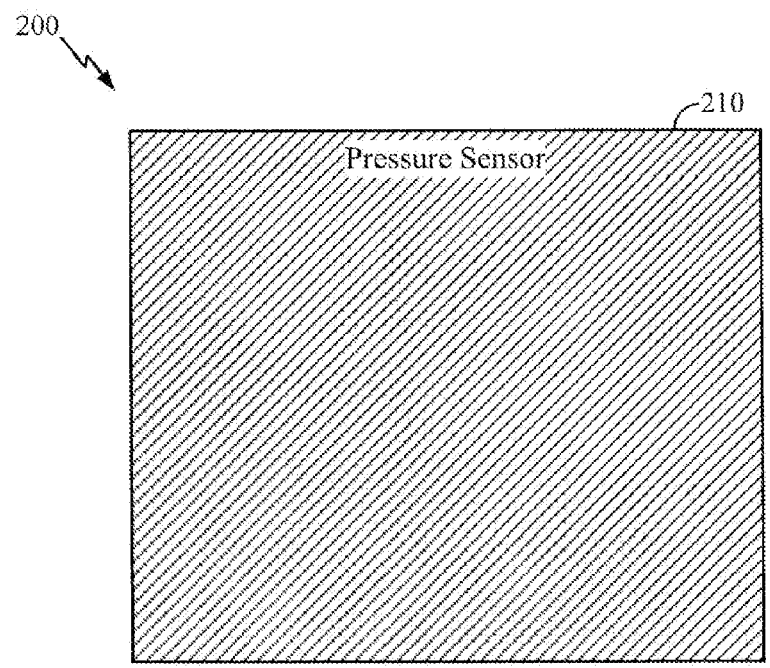
FIG. 2B is a block diagram of a back side of the mobile device having a pressure sensor.

With reference to FIG. 2A, a block diagram of a front side of the mobile device 101 is shown to illustrate a system 200 in which the mobile device 101 includes a pressure sensor 210. As can be seen in FIG. 2A, a front side of the exemplary mobile device 101 is shown having a display device 116, a user interface 118, and a pressure sensor 210. Reference can also be made to FIG. 2B which shows a back side of the mobile device 101 with the pressure sensor 210.

In one embodiment, a monitor function may be based upon pressure sensor 210 readings. The pressure sensor 210 may be mounted on one or more of the front side (FIG. 2A), the back side (FIG. 2B), and/or the sides of the mobile device 101. The pressure sensor 210 may be located at all of these positions, some of these positions, or at only certain portions of these positions, dependent upon design and implementation procedures. As examples, the pressure sensor 210 may be a resistive pressure sensor or a capacitive pressure sensor or a combination of both. The pressure sensor 210 may be a pressure sensitive material that allows for pressures on the front, back, or sides of the mobile device 101 to be measured.

The pressure sensor 210 may be utilized to measure at least one of finger pressure, grip pressure, number of fingers being used, left-hand use, right-hand use, multiple hand use, location, and the position of the mobile device 101 (e.g., portrait or landscape position). Based upon the pressure information from the front, back, or sides of the pressure sensor 210 of the mobile device 101, the monitoring process 122 may determine whether the mobile device 101 is being carried by the user or is not in use. These types of pressure sensors 210 that may be resistive or capacitive are well known in the art. As an example, these types of pressure sensors 210 may be formed from chemical membranes and may be made from a clear material such that they are unseen by the mobile device user.

By utilizing pressure information from the pressure sensor 210 from the front, back, or sides of the mobile device 101, as a monitor function in the monitoring process 122, the authentication process 120 may determine whether or not the mobile device 101 is being carried, is not in use, or is being used by a different non-authorized user. As an example, if the user normally carries the mobile device 101 in a pocket, purse, or briefcase, the prior measured pressures may be utilized in the authentication process 120 as monitor functions to determine whether the current pressure measurements are characteristic of the user. Therefore, it may be determined that the mobile device 101 has gone from being typically carried in a front pocket and is now being carried in a back pocket, which may be indicative of the mobile device 101 now being used by another non-authorized user (e.g. a thief). This may be determined due to there being more pressure measured by the pressure sensor 210 of the mobile device 101 due to the gluteus maximum muscle being impacted against the pressure sensor 210 (carried in a back pocket) as opposed to less pressure being applied when it is carried in a front pocket.

As should be apparent to those of skill in the art, a wide variety of pressure sensor 210 measuring schemes as a monitoring function of the monitoring process 122 for the authentication process 120 to determine whether or not the authentication value threshold has been met may be utilized. As a particular example, a great change in the pressure sensor 210 readings for an extended period of time may be given a very high weight causing the threshold to be exceeded and causing the locking function to be implemented.

Figure 3:
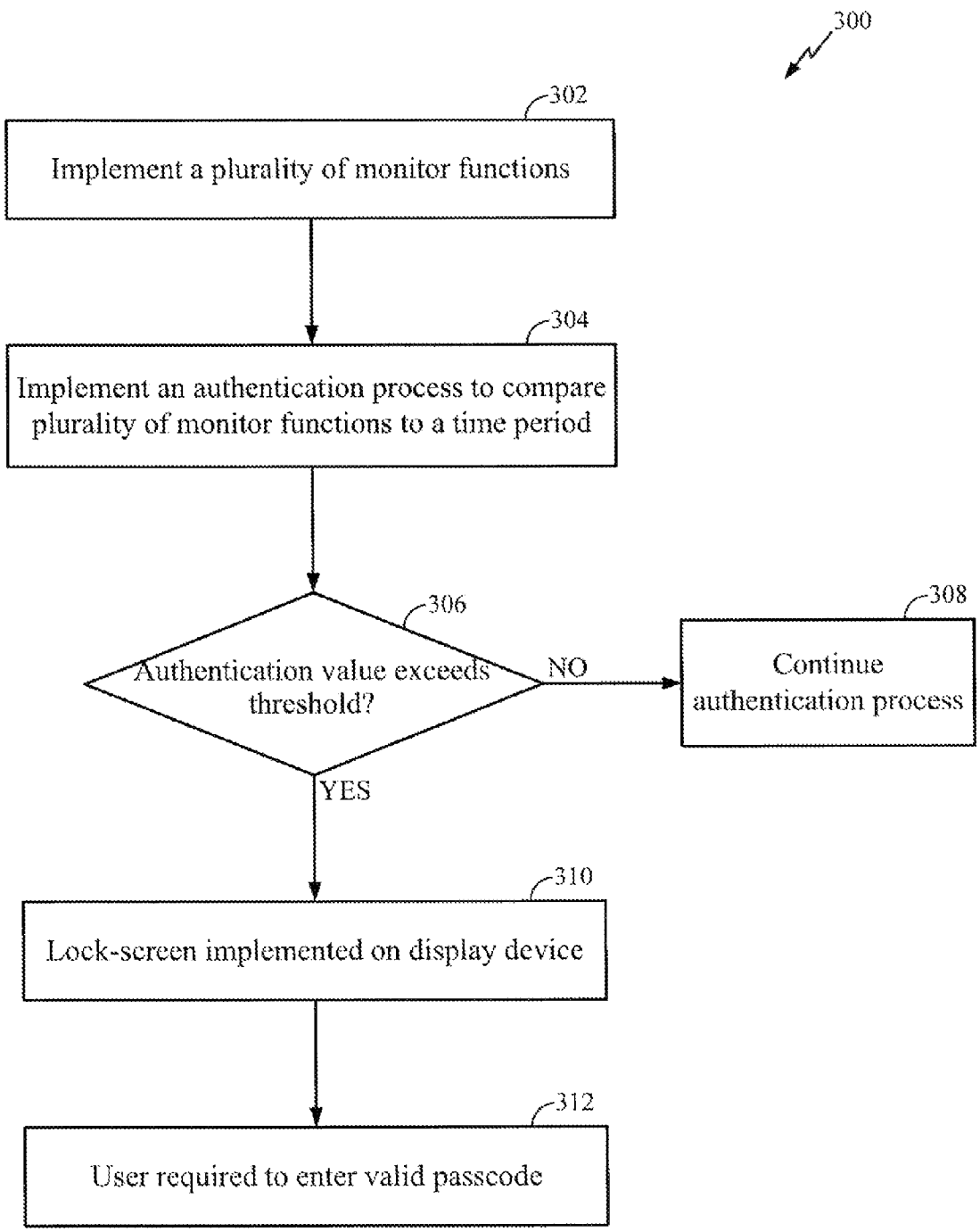
FIG. 3 is a flow diagram that illustrates a process to implement a plurality of monitor functions for the authentication process.

With reference to FIG. 3, a flow diagram is shown to illustrate a process 300 to implement a plurality of monitor functions for the authentication process. At block 302, a plurality of monitor functions are implemented. At block 304, an authentication process is implemented to compare the plurality of monitor functions to a time period to determine an authentication value. In particular, the authentication process compares the output of the plurality of monitor functions to the average output of the same functions over the time period. At decision block 306, it is determined whether the authentication value exceeds a threshold. If not, the authentication process is continued (block 308) and a lock-screen is not implemented. On the other hand, if at decision block 306, the authentication value exceeds the threshold, then a lock-screen is implemented on the display device (block 310), and the user is required to enter a valid passcode (block 312).

Also, in one embodiment, the monitoring process may be implemented after the user has entered a valid passcode (e.g., after turning the mobile device on, after an authentication process, or for a particular application being enabled, etc.), to ensure that data collected for use in profiling the user for use in the authentication process is valid. In this embodiment, data that is, collected before the user has entered a valid passcode may be discarded. In this way, there is a higher probability that data collected for the monitoring process and the authentication process is for a valid user.

Figure 4:
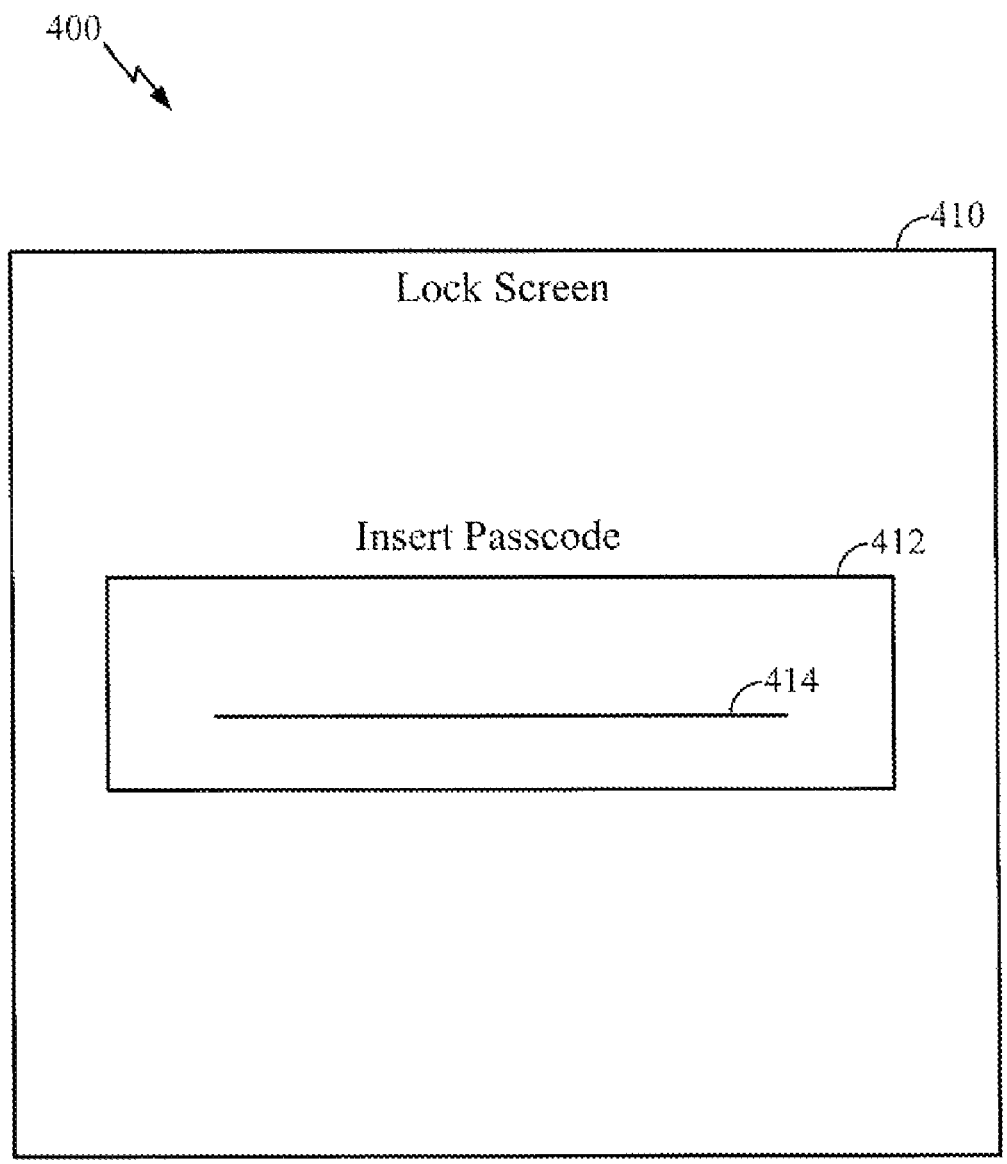
FIG. 4 is a block diagram of a display on the display device of the mobile device showing an exemplary lock screen.

With brief reference to FIG. 4, a block diagram of a display 400 on the display device is illustrated showing an exemplary lock screen 410 that denies use of the mobile device 101 by the user except to enter a passcode 414 in an insert passcode window 412. As previously described, by utilizing the authentication process according to embodiments of the invention, a user is not required to enter a passcode every time a phone call is being made or when on-line transactions are being performed (e.g., on-line shopping, on-line banking, etc.); but only when the authentication value exceeds a threshold based upon the monitor functions implemented by the monitoring process. Thus, typically, the mobile device user is not required to enter a passcode every time one of these functions is being performed.

However, when the authentication value exceeds a threshold, then the lock-screen 410 is implemented on the display device and the user is required to enter a valid passcode 414 in the insert passcode window 412.

In one embodiment, the threshold target may based upon the integral sum of all of the selected monitor functions, in which each selected monitor function is multiplied by its selected weighing factor, which is divided by a pre-determined period of time. The pre-determined period of time may be selected by the user or the mobile device 101. Also, particular monitor functions may be associated with particular time periods. If the authentication process determines that this authentication value calculation exceeds the threshold target, then the lock-screen 410 may be implemented on the display device such that the user may be required to enter a valid passcode 414 via the user interface for authentication purposes. According to embodiments of the invention, the pre-determined weights for a wide variety of different monitor functions may be selected by a user, as will be more particularly hereinafter described.

Figure 5:
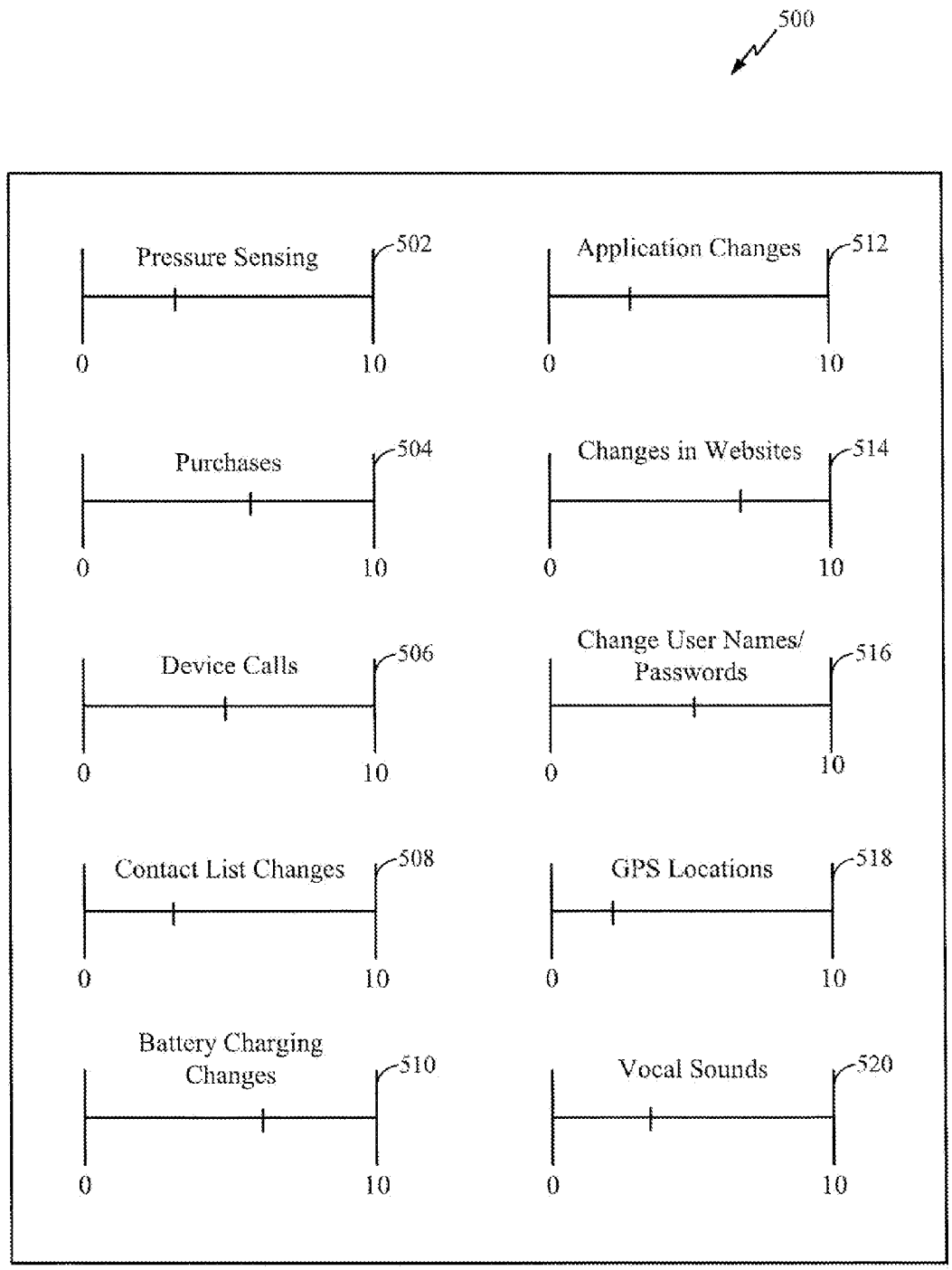
FIG. 5 is a diagram of a display on the display device of the mobile device of different types of monitor functions implemented by the monitoring process and the authentication process.

With reference to FIG. 5, FIG. 5 is a diagram of a display on the display device 116 of the mobile device 101 of different types of monitor functions 500 implemented by the monitoring process 122 and the authentication process 120 of the mobile device 101. In one embodiment, these monitor functions 500 may be displayed on the display device 116 of the mobile device 101 for selection and weighting by the user. Thus, the user may select pre-determined weights for the monitor functions 500.

As shown in FIG. 5, as an example, these weights for each of the monitor functions 500 may be between 0 and 10. Each of these monitor functions 500 may be selected by a user and the user, by sliding the vertical marker as shown in FIG. 5, may pick a weight between 0 and 10 for the selected monitor function on the display device. Of course, many other ways to select monitor functions and select a weight factor are also possible.

Thus, a number of different types of monitor functions 500 may be displayed for selection and weighting by the user. As examples, on or more of the following monitor functions may be selected and weighted by a user: pressure sensing 502, purchases 504, device calls 506, contact list changes 508, battery charging changes 510, application changes 512, changes in web sites 514, changes in user names/passwords 516, GPS locations 518, and vocal sounds 520. It should be appreciated that these are only examples and a wide variety of different monitor functions may be utilized and weighted by the user. Examples of these monitor functions and their implementation by the monitoring process 122 and authentication process 120 will be hereinafter briefly discussed.

As to pressure sensing 502, this monitor function may be selected and weighted by a user. As previously described, pressure sensing may be automatically implemented by the mobile device 101. As examples, pressure sensing may be implemented by the pressure sensor 210, previously described.

As to purchases 504, this monitor function may be selected and weighted by a user. The purchases monitor function 504 relates to the type of purchases being made by the user utilizing a web browser. Examples of these types of web browser purchases include E-TRADE, EBAY, AMAZON, ITUNES, etc.

As to device calls 506, this monitor function may be selected and weighted by a user. The device calls monitor function 506 refers to device calls. The monitoring function may be based and weighted based upon different mobile devices being called, different mobile devices calling the mobile device 101, or different web sites being visited. For example, the device calls monitor function 506 may monitor new sets of numbers being dialed that are not on the contact list, or international calls being made, or new sets of people calling the mobile device 101 that have not called before. All of these types of device calls may be monitored. Another type of call related monitoring function may include switching to Voice over IP (VoIP) services as opposed to the present cellular service. This monitoring function may also be given a high weighting.

As to contact list changes 508, this monitor function may be selected and weighted by a user. The contact list changes monitor function 508 may monitor changes in the user's contact list. For example, the contact list changes monitor function 508 may determine a high degree of changes in the user's contact list or the contact list being completely deleted. Another type of sudden change by a user may include using a new or different SIM card. This monitoring function may also be given a high weighting.

As to battery charging 510, this monitor function may be selected and weighted by a user. The battery charging monitor function 510 may monitor changes in battery charging. For example, the battery (e.g., power supply 114) may be draining a lot faster or slower than is typical. Further, the battery may be charged at different times or different locations. All of these types of battery charging changes may be monitored by the battery charging monitor function 510.

As to application changes 512, this monitor function may be selected and weighted by a user. The application changes monitor function 512 monitors application changes. The application changes monitor function 512 may monitor the different usage of applications, the deletion of applications, or the addition of applications. For example, if user often plays Zynga Poker, but suddenly most of the gaming on the device are via applications like Speed Driver and X-Racing, this may trigger a check for user to verify their identity.

As to changes in web sites 514, this monitor function may be selected and weighted by a user. The changes in web sites monitor function 514 monitors changes in web sites visited. For example, the URLs being visited may be different than past history. It may be determined that the web content is very different. As one particular example, a user may have previously visited many business web sites and now only visits sports web sites.

As to changes in user names and passwords 516, this monitor function may be selected and weighted by a user. The changes in user names and passwords monitor function 516 monitors changes in user names and passwords.

As to global positioning system (GPS) locations 518, this monitor function may be selected and weighted by a user. The GPS locations monitor function 518 monitors GPS locations. For example, current locations measured may be different than usual GPS locations. As one particular example, the time of day, accelerometer readings, and GPS readings may indicate different types of activity that the mobile device 101 is now being exposed to; as opposed to the usual time of day, accelerometer readings, and GPS readings associated with the user driving to work or driving home (e.g., as opposed to the normal time of day, normal accelerometer measurements and GPS measurements stored in the mobile device 101 history). Further, the speed of travel may also be measured to determine differences between speeds. For example, the mobile device may be suddenly subject to speeds of 85 mph whereas it typically was only subject to speeds of 35 mph. Thus, the current GPS locations measured and the current dates and times may not be the same as previous GPS locations and the previous dates and times that are stored by the mobile device 101. This may indicate that the mobile device 101 may be being used by an unauthorized user There are other numerous examples of GPS locations monitor functions 518 that may monitored by the monitoring process. Another example includes a city that is added to a weather application that matches new GPS locations. Another example includes current GPS locations that do not match locations in the calendar. In this instance, the mobile device 101 keeps a record of GPS locations of meeting rooms the user has often attended and the mobile device 101 may trigger, the authentication process if it is detected that the user is missing or not present at the GPS locations at all of the meetings. Further, in terms of GPS, every time a mobile device 101 is plugged into a charger the mobile device 101 records the GPS coordinates to a running history and when the mobile device 101 is plugged into a charger, the mobile device 101 may check the GPS location against previous histories and may determine that the mobile device 101 is being constantly charged at different GPS locations. These are other types of GPS locations monitor functions 518 that may be monitored by the monitoring process. Moreover, there is charger authentication in which the charger may have a different serial number which may be monitored.

As to vocal sounds 520, this monitor function may be selected and weighted by a user. The vocal sounds monitor function 520 monitors vocal sounds. The vocal formant of different users are significantly different. For example, some are at 90 Hz and others are at 150 Hz. These vocal changes may indicate that a different person is utilizing the mobile device 101.

Although different types of monitor functions have been described with reference to FIG. 5, a wide variety of different types of monitor functions may also be utilized. Examples of these include different types of stock tickers that are deleted from applications for the mobile device 101 and new stock tickers being added. Different pictures in the camera being deleted and new ones being added. Different types of news feeds being added. Dramatic improvement or loss in the performance of various games and applications. As another example words per minute (WPM) averages in typing may have significantly changed (better or worse).

It should be appreciated that these weights assigned to these various monitoring functions may be selected by a user. This allows the user to indicate what features the user believes would be most relevant to detecting if the mobile device 101 is missing or stolen. Further, the weight factors may be updated by the mobile device 101 based upon authentication process triggers repeatedly occurring and being followed by correct passcodes. For example, the user may charge the user's mobile device 101 in a different location every night because the user is a traveling salesman, such that the weight function given to this monitoring function may be lowered to help eliminate false positives and the repetitive requests for passcode authentication. Additionally, the mobile device provider of wireless services may also select the monitor functions or the weighting factors of the monitor functions.

According to embodiments of the previously described mobile device 101, a user does not have to enter a passcode 414 every time to utilize certain functions of the mobile device 101, such as on-line transactions, on-line banking, phone calls, etc., or at frequent time intervals; but only when a threshold value is exceeded as part of continuously implemented authentication process 120 to determine an authentication value that is based upon the monitoring process 122 of various monitor functions that is implemented to verify that the correct user is using the mobile device 101. In one embodiment, the authentication process 120 compares the output of the plurality of monitor functions to the average output of the same functions over a time period. If the authentication value exceeds the threshold, a lock-screen 410 may be implemented on the display device 116 such that the user may be required enter a valid passcode 414 via the user interface 118 for authentication purposes.

In one embodiment, the threshold target may based upon the integral sum of all of the selected monitor functions, in which each selected monitor function is multiplied by its selected weighing factor, which is divided by a pre-determined period of time. This pre-determined period of time may be selected by the mobile device 101 or by the user. Also, particular monitor functions may be associated with particular time periods. If the authentication process 120 determines that the authentication value calculation exceeds the threshold target, then the lock-screen 410 may be implemented on the display device 116 such that the user may be required to enter a valid passcode 414 via the user interface 118 for authentication purposes. Also, as previously described the monitor functions and the weighting factors for the monitor functions may be selected by the user. Additionally, the mobile device provider of wireless services may also select the monitor functions or the weighting factors of the monitor functions.

Thus, according to embodiments of the invention, when utilizing the previously-described mobile device 101, the user does not have to enter a passcode every time the user wishes to use the phone for such purposes as on-line transactions, on-line banking, phone calls and other types of functions or at very frequent time intervals. In particular, by utilizing the previously-described mobile device 101 that is less obtrusive than other types of security systems implemented by other types of mobile devices, the chances that the locking system of the mobile device 101 is actually used by the user, instead of simply being disabled by the user, is significantly increased. Further, at the same time, when required, the lock screen system is implemented to protect the user from fraudulent abuse if the mobile device 101 is actually stolen or lost.

Figure 6:
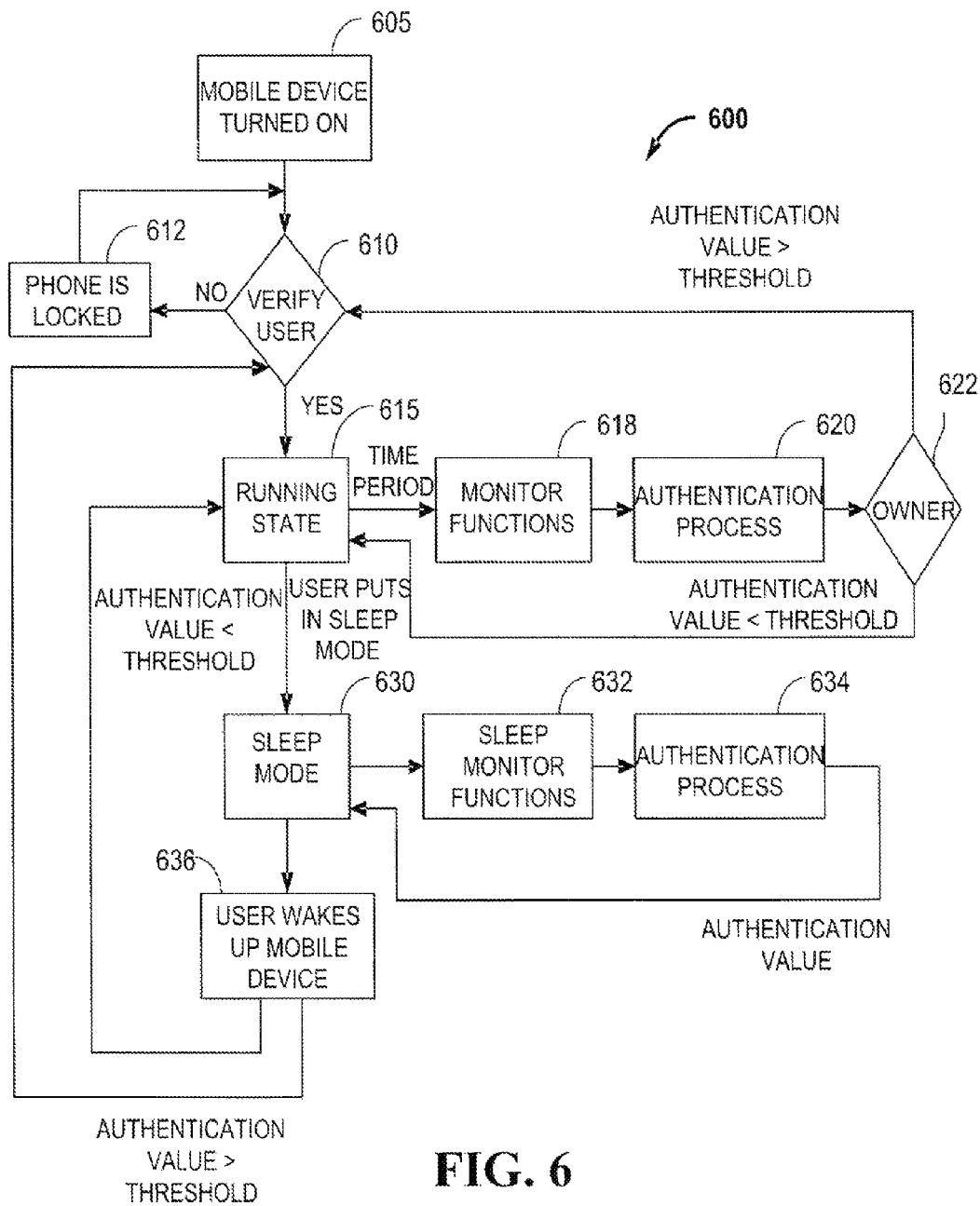
FIG. 6 is a flow diagram that illustrates a process to implement a plurality of monitor functions for the authentication process during sleep mode and wake-up.

With reference to FIG. 6, a flow diagram is shown to illustrate a process 600 to implement a plurality of monitor functions for the authentication process during sleep mode and wake-up. At block 605, the mobile device 101 is turned on. At decision block 610, the user is verified. For example, as previously described, a lock-screen may be implemented that requires a user to enter a valid passcode into a passcode window in order to allow the user to Utilize the applications of the mobile device 101. If the user is not verified, the phone is locked (block 612) with the lock-screen, but as shown by process 600, the verification process 610 may be implemented again to allow the user to verify that they are the authorized user.

If the user is verified, then the mobile device 101 enters into the standard running state (block 615). As previously described, in the standard running state, the mobile device may implement a plurality of monitor functions (block 618) and an authentication process (block 620). In particular, the authentication process 620 is implemented to compare the plurality of monitor functions 618 over a time period. Even more particularly, the authentication process compares the output of the plurality of monitor functions to the average output of the same functions over the time period. At decision block 622, it is determined whether the user of the mobile device 101 is actually the owner of the mobile device 101.

As previously described in detail, if it is determined that the authentication value of the authentication process is less than the threshold, then the user of the mobile device 101 is most likely the proper owner and the running state (block 615) continues in normal operation. On the other hand, if it is determined that the authentication value of the authentication process is greater than the threshold, then process 600 returns to decision block 610 to verify the authenticity of the user such that a lock-screen is implemented and the user is required to enter a valid passcode.

Examples of monitor functions implemented in the running state, as previously described in detail, include such functions as: pressure sensor readings (e.g., finger pressure; grip pressure; number of fingers being used; left-hand use; right-hand use; multiple hand use; location; pressure against backside, frontside, sides), purchases over the Internet, device calls, contact list changes, power charge changes, peripheral device changes, battery charging changes, application changes, changes in web sites visited, changes in picture albums, changes in user names/passwords, GPS locations, rates of speed changes (e.g. 85 mph vs. 35 mph), words per minute typed changes, vocal sounds, etc.

Continuing with the process 600, at block 630 the user puts the mobile device 101 into sleep mode or the mobile device 101 automatically enters sleep mode. While in sleep mode, the mobile device 101 still implements monitor functions (e.g. sleep monitor functions (block 632)) and the authentication process (block 634) calculating an authentication value, as previously described. The authentication value is continuously updated during the sleep mode such that when the mobile device 101 is attempted to be woken up by the user (block 636), process 600 determines whether to automatically wake-up the mobile device into the running state (block 615) or again require user verification (decision block 610).

In the wake-up mode 636, if it is determined that the authentication value of the authentication process from the sleep mode is less than the threshold, then the user of the mobile device 101 is most likely the proper owner and the running state (block 615) continues in normal operation. On the other hand, if it is determined that the authentication value of the authentication process from the sleep mode is greater than the threshold, then process 600 returns to decision block 610 to verify the authenticity of the user such that a lock-screen is implemented and the user is required to enter a valid passcode.

Monitor functions in the sleep mode are similar to the monitor functions of the running state except that monitor functions without user interaction are more prominent. Examples of sleep mode monitor functions implemented in the sleep state, as previously described in detail, include such functions as: pressure sensor readings (e.g., finger pressure; grip pressure; number of fingers being used; left-hand use; right-hand use; multiple hand use; location; pressure against backside, frontside, sides), power charge changes, peripheral device changes, battery charging changes, GPS locations, rates of speed changes (e.g. 85 mph vs. 35 mph), etc.

Particular examples of sleep mode monitor functions (block 632) that are measured for the authentication process (block 634) may include GPS locations, pressure sensor readings, and rates of speed. For example, if while in sleep mode, the pressure sensor readings indicate extreme frontside pressure, GPS locations of Las Vegas, and a high rate of speed whereas the normal monitor functions have very little pressure sensor readings, GPS locations of Washington D.C., and low speed, the authentication value calculated by the authentication process would be higher than the threshold and the user may be required to verify their authenticity by entering a valid passcode in the lock screen (block 610).

Also, in one embodiment, the monitoring process may be implemented after the user has entered a valid passcode (e.g., after turning the mobile device on, after an authentication process, or for a particular application being enabled, etc.), to ensure that data collected for use in profiling the user for use in the authentication process (e.g., authentication processes 620, 634) is valid. In this embodiment, data that is collected before the user has entered a valid passcode may be discarded. In this way, there is a higher probability that data collected for the monitoring process and the authentication process is for a valid user.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements in some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device comprising:
   a display device;
   a user interface;
   a pressure sensor;
   a processor configured to execute instructions to:
      implement a monitoring process to monitor operation of the mobile device and to implement a plurality of monitor functions;
         wherein the monitoring process is implemented after a user has entered a valid passcode;
         wherein at least one of the plurality of monitor functions is based upon pressure sensor readings from the pressure sensor;
      implement an authentication process to compare the plurality of monitor functions to a time period to determine an authentication value;
         wherein if the authentication value exceeds a threshold, a lock screen is implemented on the display device, and
            the user is required to enter the valid passcode through the user interface for authentication, and when the threshold is not exceeded, the user is not required to enter the valid passcode;
         wherein each monitor function is associated with a pre-determined weight; and
   a memory configured to store the instructions.

2. The mobile device of claim 1, wherein the pre-determined weights for the monitor functions are selected by the user.

3. The mobile device of claim 1, wherein the pressure sensor is located on at least one of a backside, a frontside, or a side of the mobile device to provide pressure sensor readings for the monitor function.

4. The mobile device of claim 3, wherein the pressure sensor is at least one of a resistive pressure sensor or a capacitive pressure sensor.

5. The mobile device of claim 3, wherein the pressure sensor measures at least one of finger pressure, grip pressure, number of fingers, left hand use, right hand use, multiple hand use, location, or position to provide pressure sensor readings for the monitor function.

6. The mobile device of claim 1, wherein a monitor function is based upon purchases utilizing a web browser.

7. The mobile device of claim 1, wherein a monitor function is based upon at least one of a contact list being deleted, different devices being called, different devices calling the mobile device, or different web sites being visited.

8. The mobile device of claim 1, wherein a monitor function is based upon changes in battery charging.

9. The mobile device of claim 1, wherein a monitor function is based upon at least one of different usage of applications, deletion of applications, or addition of applications.

10. The mobile device of claim 1, wherein a monitor function is based upon changes in web sites visited.

11. The mobile device of claim 1, wherein a monitor function is based upon at least one of changes of usernames or passwords associated with applications.

12. The mobile device of claim 1, wherein a monitor function is based upon GPS locations being different from usual GPS locations.

13. The mobile device of claim 1, wherein a monitor function is based upon a change in vocal sounds.

14. A method to provide security for a mobile device comprising:
   monitoring operation of the mobile device;
   performing a monitor process to implement a plurality of monitor functions; and
      wherein the monitor process is implemented after a user has entered a valid passcode;
      wherein at least one of the plurality of monitor functions is based upon pressure sensor readings from a pressure sensor;
   performing an authentication process to compare the plurality of monitor functions to a time period to determine an authentication value;
      wherein each monitor function is associated with a pre-determined weight;
      wherein if the authentication value exceeds a threshold, implementing a lock screen on a display device of the mobile device, and
         requiring the user to enter the valid passcode through a user interface of the mobile device for authentication; and
      wherein if the threshold is not exceeded, the user is not required to enter the valid passcode.

15. The method of claim 14, further comprising allowing the user to select the pre-determined weights for the monitor functions.

16. The method of claim 14, wherein the pressure sensor is located on at least one of a backside, a frontside, or a side of the mobile device to provide pressure sensor readings for the monitor function.

17. The method of claim 16, wherein the pressure sensor is at least one of a resistive pressure sensor or a capacitive pressure sensor.

18. The method of claim 16, wherein the pressure sensor measures at least one of finger pressure, grip pressure, number of fingers, left hand use, right hand use, multiple hand use, location, or position to provide pressure sensor readings for the monitor function.

19. The method of claim 14, wherein a monitor function is based upon purchases utilizing a web browser.

20. The method of claim 14, wherein a monitor function is based upon at least one of a contact list being deleted, different devices being called, different devices calling the mobile device, or different web sites being visited.

21. The method of claim 14, wherein a monitor function is based upon changes in battery charging.

22. The method of claim 14, wherein a monitor function is based upon at least one of different usage of applications, deletion of applications, or addition of applications.

23. The method of claim 14, wherein a monitor function is based upon changes in web sites visited.

24. The method of claim 14, wherein a monitor function is based upon at least one of changes of usernames or passwords associated with applications.

25. The method of claim 14, wherein a monitor function is based upon GPS locations being different from usual GPS locations.

26. The method of claim 14, wherein a monitor function is based upon a change in vocal sounds.

27. A mobile device comprising:
means for monitoring operation of the mobile device;
means for pressure sensing;
means for performing a monitor process to implement a plurality of monitor functions; and
wherein the monitor process is implemented after a user has entered a valid passcode; and
wherein at least one of the plurality of monitor functions is based upon pressure sensor readings from the means for pressure sensing;
means for performing an authentication process to compare the plurality of monitor functions to a time period to determine an authentication value;
wherein each monitor function is associated with a pre-determined weight;
wherein if the authentication value exceeds a threshold, means for implementing a lock screen on a display device of the mobile device, and
means for requiring the user to enter the valid passcode through a user interface of the mobile device for authentication; and
wherein if the threshold is not exceeded, the user is not required to enter the valid passcode.

28. The mobile device of claim 27, further comprising means for allowing the user to select the pre-determined weights for the monitor functions.

29. The mobile device of claim 27, wherein the means for pressure sensing is located on at least one of a backside, a frontside, or a side of the mobile device to provide pressure sensor readings for the monitor function.

30. The mobile device of claim 29, wherein the means for pressure sensing is at least one of a resistive pressure sensor or a capacitive pressure sensor.

31. The mobile device of claim 29, wherein the means for pressure sensing measures at least one of finger pressure, grip pressure, number of fingers, left hand use, right hand use, multiple hand use, location, or position to provide pressure sensor readings for the monitor function.

32. The mobile device of claim 27, wherein a monitor function is based upon purchases utilizing a web browser.

33. The mobile device of claim 27, wherein a monitor function is based upon at least one of a contact list being deleted, different devices being called, different devices calling the mobile device, or different web sites being visited.

34. The mobile device of claim 27, wherein a monitor function is based upon changes in battery charging.

35. The mobile device of claim 27, wherein a monitor function is based upon at least one of different usage of applications, deletion of applications, or addition of applications.

36. The mobile device of claim 27, wherein a monitor function is based upon changes in web sites visited.

37. The mobile device of claim 27, wherein a monitor function is based upon at least one of changes of usernames or passwords associated with applications.

38. The mobile device of claim 27, wherein a monitor function is based upon GPS locations being different from usual GPS locations.

39. The mobile device of claim 27, wherein a monitor function is based upon a change in vocal sounds.

40. A computer program product comprising:
a non-transitory computer-readable medium comprising code for:
monitoring operation of the mobile device;
performing a monitor process to implement a plurality of monitor functions; and
wherein the monitor process is implemented after a user has entered a valid passcode; and
wherein at least one of the plurality of monitor functions is based upon pressure sensor readings from a pressure sensor;
performing an authentication process to compare the plurality of monitor functions to a time period to determine an authentication value;
wherein each monitor function is associated with a pre-determined weight;
wherein if the authentication value exceeds a threshold, implementing a lock screen on a display device of the mobile device, and
requiring the user to enter the valid passcode through a user interface of the mobile device for authentication; and
wherein if the threshold is not exceeded, a the user is not required to enter the valid passcode.

41. The computer program product of claim 40, further comprising code for allowing the user to select the pre-determined weights for the monitor functions.

42. The computer program product of claim 40, wherein the pressure sensor is located on at least one of a backside, a frontside, or a side of the mobile device to provide pressure sensor readings for the monitor function.

43. The computer program product of claim 42, wherein the pressure sensor is at least one of a resistive pressure sensor or a capacitive pressure sensor.

44. The computer program product of claim 42, wherein the pressure sensor measures at least one of finger pressure, grip pressure, number of fingers, left hand use, right hand use, multiple hand use, location, or position to provide pressure sensor readings for the monitor function.

45. The computer program product of claim 40, wherein a monitor function is based upon purchases utilizing a web browser.

46. The computer program product of claim 40, wherein a monitor function is based upon at least one of a contact list being deleted, different devices being called, different devices calling the mobile device, or different web sites being visited.

47. The computer program product of claim 40, wherein a monitor function is based upon changes in battery charging.

48. The computer program product of claim 40, wherein a monitor function is based upon at least one of different usage of applications, deletion of applications, or addition of applications.

49. The computer program product of claim 40, wherein a monitor function is based upon changes in web sites visited.

50. The computer program product of claim 40, wherein a monitor function is based upon at least one of changes of usernames or passwords associated with applications.

51. The computer program product of claim 40, wherein a monitor function is based upon GPS locations being different from usual GPS locations.

52. The computer program product of claim 40, wherein a monitor function is based upon a change in vocal sounds.

* * * * *